UNITED STATES PATENT OFFICE.

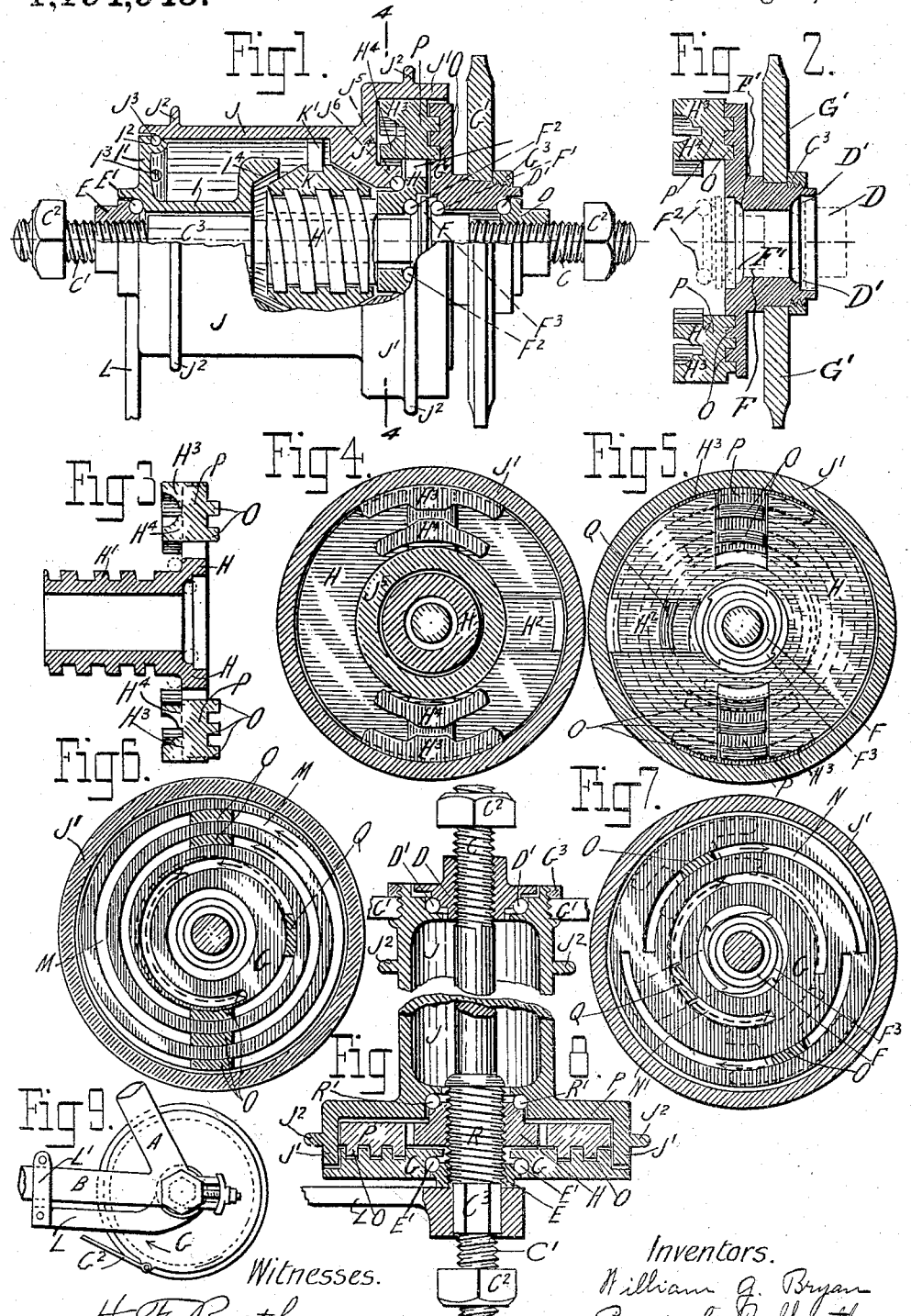

WILLIAM GEORGE BRYAN AND PERCIVAL BERNARD SHEATHER, OF SYDNEY, NEW SOUTH WALES, AUSTRALIA.

BICYCLE-GEARING.

1,194,945.     Specification of Letters Patent.     Patented Aug. 15, 1916.

Application filed February 10, 1913. Serial No. 747,362.

*To all whom it may concern:*

Be it known that we, WILLIAM GEORGE BRYAN and PERCIVAL BERNARD SHEATHER, citizens of the Commonwealth of Australia, residing at Sydney, New South Wales, in the Commonwealth of Australia, have jointly invented new and useful Improvements in Bicycle-Gearing, of which the following is a specification.

This invention relates to hubs of driving wheels for bicycles provided with devices whereby the operator may operate and regulate the vehicle for driving or braking it or permitting it to run with free driving wheel as preferred. These operations and regulations are effected by the combination of two proximate disks, one carrying radially movable slides having projecting parts, the other channeled in convolutions to receive the same in combination with certain other elements of mechanism hereinafter more particularly set forth and claimed.

In the accompanying drawings: Figure 1 represents a central longitudinal section, with some parts left in side elevation, of a hub-shell and coöperating mechanical parts embodying our invention and mostly inclosed within said shell; Fig. 2 represents in detail view a similar section of the channeled disk and sprocket wheel; Fig. 3 represents a similar view of the other disk above referred to, the slides movable therein and the connected externally screw-threaded sleeve hereinafter described; Fig. 4 represents a cross-section on the line 4—4 of Fig. 1, through parts $H^3$ $H^4$ looking to the right; Fig. 5 represents a like elevation of the outer face of the same; Fig. 6 represents a section of the channeled disk taken at right angles to the axle; Fig. 7 represents a similar view of a modification showing the channels in separated segments; Fig. 8 represents on a smaller scale a longitudinal central section of the mechanism showing the brake only in combination with the shell, certain parts being in elevation; and Fig. 9 represents an end elevation of the parts illustrated by Fig. 8, the same being shown externally only and on a still smaller scale, with certain proximate parts of the bicycle structure broken away.

The axle which supports the mechanism passes through the usual forked bicycle framing A and B, Fig. 9, and is provided with ends C and C′ screw-threaded in opposite directions with clamping nuts $C^2$ thereon, the intermediate part of said axle not being screw-threaded, but in part cylindrical and in part prismatic in form. Nuts or screw-threaded cones D and E on said screw-threaded ends are used for tightening the hub mechanism and are provided with anti-friction balls D′ and E′ which fit into annular grooves of the inner parts of said nuts D and E, as well as into corresponding grooves of certain proximate devices hereinafter described. A sleeve F fixed on the said axle is provided around its central part with a series of shoulders $F^3$, arranged equidistantly and forming a notched annular locking ring considered collectively. Anti-friction balls F′ $F^2$ are arranged in annular series on said sleeve at each side of said locking ring to supply ball-bearings for the two coöperating rotary actuating disks G and H arranged face to face. The balls D′ before mentioned afford like bearings for the outer end of a tubular attachment or hub integral with disk G, so that this disk is mounted on two series of ball-bearings D′ and F′, as shown in Figs. 1 and 2. The proximate faces of the disks G and H are in frictional contact and have engaging parts as hereinafter described and shown in said figures.

A sleeve I fits the prismatic part $C^3$ of the axle, surrounding a portion of its length and is annularly grooved to receive the balls E′ aforesaid, permitting the nut E to be tightened against said sleeve without undue friction. The outer part of said sleeve has an outwardly extending disk-form wall I′ integral with said sleeve closing the inner end of the casing J, said wall having a peripheral groove $I^2$ containing a similar series of small anti-friction balls $J^3$ interposed between said wall and the body of said hub-casing. An opening in the inner wall of this groove at $I^3$ admits these balls conveniently into said groove and is afterward suitably plugged as indicated in Fig. 1. The inner end of said sleeve is enlarged to form a head concaved on the inner side and is there provided with an annular beveled conoidal stop face $I^4$ adapted to fit the proximate face of a doubly beveled nut K having its ends conoidal and presented in opposite directions, and traveling on external screw-threads of a rearwardly extending tubular part H′ of said disk H aforesaid. A band spring K′ is attached to this traveling nut and bears outwardly against the inner face of the hub casing J, holding said nut against turning with the screw-threaded part H' of disk H when the latter is rotated. This spring, however, is only of such tension as will permit the said hub casing to turn without undue strain when the said nut is held positively by said stop-face against turning. The beveled face of said nut on the outer side thereof is adapted to engage a beveled annular face formed on a depending conoidal part J⁴ of the interior of casing J said part presenting a conoidal friction face. This conoidal part also has an annular groove in its inner face to receive a circular series of antifriction balls J⁶, which, with the balls J³ aforesaid afford the necessary double ball-bearings of the hub-casing J. When the traveling nut K is at the forward end of its travel it comes into contact with the bevel friction face of conoidal part J⁴, when in its rear position with the friction face I⁴, which stops it and prevents the rotation of said slide-carrying disk.

The disk G has a sprocket wheel G' clamped by a nut G³ on its outer hub above mentioned. Its inner face as shown in Fig. 6 is provided with a guide channel M wound in a series of eccentric convolutions. This receives laterally projecting lugs integral with slides P, which are arranged in radial slots of the disk H, and move outward or inward radially in the same. Each of these slides P carries a drive block H³ having an outwardly presented circular peripheral face for engaging a corresponding inner face of an enlarged part J' of said hub-casing J to drive the hub; also with a brake-block H⁴ for engaging by its annular inner face the annular outer brake face J⁵ of cone J⁴ aforesaid. There are thus two gripping devices for driving, namely, the drive blocks H³ and the outer conoidal face of the traveling nut K with the parts of the hub-casing which they are pressed against respectively. The drive blocks are the more important means for this purpose.

A lug Q, similar to lugs O, is integral with a locking slide H², Fig. 5, moving in one of said radial slots as before stated with regard to the slides P. As shown in Fig. 3, the lugs O engage the outer convolutions of the channel M, whereas the lug Q engages in the inner convolution, which, like the other convolutions of said channel, is eccentric and inclined like a convolution of a helix for a part of its length, but, unlike the other convolutions, has its terminal part approximately semi-circular, it being concentric with the axle from $x$ to $x$. Consequently the locking slide H² will be moved inward by the eccentric part of this convolution, taking, at the end of the eccentric part, its locking position with respect to the next notch or tooth of notched ring F³ before mentioned for locking therewith; but will not be pressed any farther toward or against this locking ring, owing to the concentric form of the remainder of said convolution. Thus a certain amount of play will be permitted, as the wheel may still turn for a part of a revolution without other effect than tightening the brakes. This play will prevent injurious jar and undue wear which otherwise might be caused by the rider applying the brakes with too much force or by reason of the momentum of the bicycle and its rider. Also, it will avoid risk of injury to the rider and of stripping the teeth from the notched or toothed ring by too abrupt a stop and lock.

The axle being fixed against rotation, the sleeve I is similarly fixed thereon by the engagement of their prismatic faces, though adjustable slightly along the same in the act of tightening by the nut E, in which operation the balls E' prevent undue friction. As an additional holdfast for the sleeve and to take the strain from the axle, we attach a lever L to the wall I', Fig. 1, and also to the frame part B, Fig. 9, using a link L' in the latter instance. The hub-casing has the usual external spoke carrying rings J². It normally runs freely on the balls J³ and J⁶ as aforesaid. The sprocket wheel G' is chain-driven as usual, by the rider, who can put into effective use, while pedaling, all the movements herein referred to.

As shown in Fig. 7 a series of separated segmental channels N may be substituted for one continuous channel M and will operate in the same way. The concentric hereinbefore described part of the inner convolution is marked N' on this figure.

In forward driving, the convolute-channeled disk G and slide-bearing disk H turn together, owing to the friction of their faces, until the nut K is drawn, by the screw-threads of part H', into contact with the beveled friction face of the part J⁴ of the hub-casing and the frictional resistance between said beveled face and the conoidal outer end of said nut suffices to hold disk H against rotation with respect to the hub casing, so that the disk G may turn independently a short distance and its convolute channel may act on lugs O to force the drive blocks H³ into contact with the inner face of enlarged annular part J' of hub casing J as stated. If, at the beginning of the operation, the nut K be in contact, or nearly so, with the part J⁴, as shown in Fig. 1, the outward movement of the drive-blocks H³ and the driving action of the same on the hub casing will begin practically at once. This arrangement is preferred.

When the driver back-pedals, the disk G turns independently until the drive-blocks H³ have been withdrawn from contact with the hub casing, the brake-blocks H⁴ of course moving inward to an equal extent. The movement of said blocks then temporarily ceases. The disk H, being no longer held by the drive-blocks H³, turns thereafter with disk G by reason of their frictional contact, until the screw-threads of its part H′ carry the nut K inward against the fixed friction face or stop face I⁴, which holds the said nut against turning, and thereby applies sufficient resistance to disk H to prevent its turning, so that the channeled disk G may apply the brake-blocks H⁴ with steadily increasing pressure. As this approaches its maximum, the locking slide H² is protruded inwardly, engaging teeth F³, to make a positive lock as stated, though the concentric final part from $x$ to $x$ of the operative channel in G permits a little play during which disk G turns without effect on this slide, as stated, while the braking action is completed.

When the machine is running free, there is nothing to turn the disk G, and consequently the disk H and screw-threaded part H′ are not rotated and the nut K does not move into contact with the hub-casing or any fixed device. The band spring K′ then permits the hub casing to turn in frictional contact with it. This spring acts slightly as a retarder by its contact with said hub-casing during the travel of the nut K into position for driving or back-pedaling. But its chief use is to prevent the nut from turning with the screw-threads during such travel. The proper tension of said spring to insure this action though yielding to permit the hub-casing to turn without undue friction and strain on said spring when running free is of course determined in advance.

The disks G and H turn within the enlarged annular part J′ of casing J, which will very well protect the operating mechanism. With this as a brake-ring, our devices slightly modified, may be used, as in Fig. 8, for braking only. In this modification, a third set of screw-threads R on the axle, which is not prismatic, in its middle part engages the internally screw-threaded disk H, carrying the radially movable slides, which disk also is provided with ball-bearings R′ on which, as also on balls D′, the hub-casing runs freely. The balls of the latter series fit between a nut D on screw-threads C of the axle and the end of said casing away from the disks. The hub is adjusted by turning the parts D and H as needed. The slides P are simply forced outward for braking by the action of the convolute channel as the disk G turns. As there is no locking slide and no ring to actuate it, there is no peculiar construction of the inner part of said channel. The lever L in this instance is attached to a hexagonal part C³ fitted on a short prismatic part of the axle outside of nut E which holds disk G in place by means of intervening ball-bearings E′.

Having thus described our invention, what we claim as new and desire to secure by Letters Patent is:

1. In a bicycle wheel-hub mechanism, in combination with a fixed axle, a hub-casing having an enlarged annular part, presenting inwardly a driving face and an annular externally presented brake face, concentric with said annular part but of smaller diameter, a disk having a face channeled in eccentric convolutions, a slide carrying disk parallel and contiguous to said channeled disk and part and provided with a face provided with radial slots, also with a tubular, externally screw-threaded extension surrounding said axle, means for turning said channeled disk forward or backward at will, slides movable radially in said radial slots and provided with lugs engaging the channeled convolutions of the other disk to permit the operation of the said slides by the latter, each of said slides carrying a drive block arranged to bear against said driving face of the hub-casing as the slide moves radially outward and a brake block arranged to bear against said brake face of the hub-casing as the slide moves radially inward, a frictionally retarded nut traveling toward or from said disks at will on said screw-threaded extension of said slide-carrying disk, a friction-face fixed against turning on said axle and arranged for contact with said nut at the end of its travel away from said disks, the said hub-casing being also provided with a friction face for contact with said nut at the end of its travel toward said disks and the latter being free to turn together when said nut is not in contact with either of said friction faces, but the slide carrying disk being held by such contact and the channeled disk being then free to turn independently for actuating said drive blocks or said brake blocks as this disk is driven forward or backward.

2. In a bicycle wheel-hub mechanism, in combination with a fixed axle, a hub-casing having an enlarged annular part presenting inwardly a driving face, and an externally presented brake face concentric with said annular part but of smaller diameter and a conoidal friction face, a disk having a face channeled in eccentric convolutions, a slide-carrying disk parallel and contiguous to said channeled disk and provided with a face having radial slots, also with an externally screw-threaded extension surrounding said axle, means for turning said channeled disk forward or backward at will, slides movable radially in said slots and provided with lugs which engage the channeled convolutions of the other disk to permit the operation of said slides by the latter, each of said slides carrying a drive block and a brake block, the former block being arranged to bear against the said drive face of the hub-casing when said slide moves radially outward and the said brake block being arranged to bear against said brake face when the said slide moves radially inward, a frictionally retarded nut having two conoidal faces presented in opposite directions and traveling toward or from said disks at will on said screw-threaded extension of the slide carrying disk, a conoidal friction face fixed against turning and arranged for contact with the corresponding face of said nut at the end of the travel of the latter away from said disks, the other conoidal face of said nut being similarly engaged by the said friction face on the hub-casing substantially as and for the purpose set forth.

3. In bicycle wheel-hub mechanism, in combination with a fixed axle, a hub-casing provided with a driving face, a brake face and an additional friction face, a pair of contiguous disks, one of which is channeled in eccentric convolutions, the other disk being radially slotted and provided with a screw-threaded tubular extension concentric with said axle, slides movable radially in said slots bearing driving blocks and brake blocks and provided with lugs, which enter the convoluted channel or channels of the other disk, in order that the latter may operate said slides, the blocks being arranged to engage said driving face of the hub-casing when the said slides move radially in one direction and the brake blocks being arranged to engage the said brake face when the said slides move radially in the other direction, means for turning said channeled disk forward or backward as desired, a nut traveling toward or from said disks at will on said screw-threaded extension of said slide-carrying disk and arranged to engage said friction face at the end of its travel toward said disks, a spring carried by said nut bearing against said hub-casing and serving to keep said nut from turning with said extension and a fixed friction face arranged for contact with said nut at the end of its travel away from said disks.

4. In bicycle wheel-hub mechanism, in combination with a fixed axle, a hub-casing provided with a driving face and a brake face, a pair of contiguous disks, one of which is channeled in eccentric convolutions, the other disk being provided with radial slots and with a screw-threaded tubular extension concentric with said axle, means for turning said channeled disk forward or backward at will, slides movable radially in said slots, provided with lugs engaging said channeled convolutions and bearing driving blocks and brake blocks for coöperation with said driving face or brake face as the slides are moved outwardly or inwardly in said slots, a frictionally retarded nut traveling on said screw-threaded tubular extension toward or from said disks, friction faces for contact with said nut at each end of its travel, to hold said slide-carrying disk against turning, a locking slide movable in one of said radial slots and engaging one of the channeled convolutions of the other disks and a fixed device arranged to be engaged by said locking slide when the latter has been moved into its innermost position, the final part of the channeled convolution engaged by said locking slide being concentric so that the channeled disk may turn briefly without affecting this slide after the innermost position has been attained.

5. In bicycle wheel-hub mechanism, in combination with a fixed axle, a hub-casing provided with a driving face, a brake face and an additional friction face, a pair of contiguous disks, one of which is channeled in eccentric convolutions, the other disk being provided with radial slots and a screw-threaded tubular extension concentric with said axle, slides movable radially in said slots and provided with lugs engaging the channeled convolutions of the other disk, also bearing driving blocks and brake blocks for coöperation with said driving face or brake face as the slides are moved outwardly or inwardly in said slots, a frictionally retarded nut traveling on said screw-threaded extension toward or from said disks, the friction face above mentioned being arranged for contact with said nut at the end of its travel toward said disks, a sleeve in contact with said casing and adjustable on said axle longitudinally of the latter for tightening this contact, but held against turning on said axle and bearing a friction face for contact with said nut at the end of the travel of the latter away from said disks, means for adjusting this friction face toward said disks and casing and means for turning the said channeled disk backward or forward at will.

6. In bicycle wheel-hub mechanism, in combination with a fixed axle, a hub-casing provided with a driving face, a brake face and an additional friction face, a pair of contiguous disks, one of which has its operative face channeled eccentrically, the other disk having its contiguous operative face provided with radial slots, this disk being also provided with a screw-threaded extension, means for turning said channeled disk forward or backward at will, slides movable radially outward and inward in said slots and bearing driving blocks which engage with said driving face when the slides move outward and brake blocks which engage with said brake face when the slides move inward, said slides being also provided with lugs, which lugs engage the channeled convolutions of the other disk, a frictionally retarded nut traveling on said screw-threaded extension toward or from said disks according to the direction in which the latter are turned, a friction face held against turning arranged for contact with said nut when the latter reaches the end of its travel away from said disks, as the friction face first mentioned makes contact with said nut when the latter reaches the end of its travel toward said disks, a locking slide movable in one of the slots of the slide-carrying disk and provided with a lug engaging one of the channeled convolutions of the other disk and a notched ring fast on the axle arranged for engagement with said locking slide when the latter is in its innermost position, the terminal part of said channeled convolution being concentric in form for the purpose set forth.

In testimony whereof we have signed our names to this specification in the presence of two subscribing witnesses.

WILLIAM GEORGE BRYAN.
PERCIVAL BERNARD SHEATHER.

Witnesses:
HARRY A. SMEDLEY,
H. C. CAMPBELL.

Copies of this patent may be obtained for five cents each, by addressing the "Commissioner of Patents, Washington, D. C."